United States Patent [19]

Goetze, Jr.

[11] 4,043,039
[45] Aug. 23, 1977

[54] STIRRING DEVICE WITH DUAL HEAD

[76] Inventor: Britton A. Goetze, Jr., 1785 Black Oaks Lane, Wayzata, Minn. 55391

[21] Appl. No.: 654,607

[22] Filed: Feb. 2, 1976

[51] Int. Cl.² .............................................. A47J 43/28
[52] U.S. Cl. ................................................. 30/325
[58] Field of Search ....................................... 145/325

[56] References Cited

U.S. PATENT DOCUMENTS

| 19,419 | 2/1858 | Haines | 30/325 X |
|---|---|---|---|
| 1,334,169 | 3/1920 | Royer | 30/325 |
| 2,522,343 | 9/1950 | Canfield | 30/325 |
| 2,853,195 | 9/1958 | Malcolm | 30/325 UX |
| 2,887,948 | 5/1959 | Kramer et al. | 30/325 X |

FOREIGN PATENT DOCUMENTS

| 164,081 | 9/1949 | Austria | 30/325 |
|---|---|---|---|
| 756,847 | 10/1933 | France | 30/325 |

*Primary Examiner*—James L. Jones, Jr.
*Assistant Examiner*—J. T. Zatarga

[57] ABSTRACT

A kitchen utensil for stirring comprising a pair of spoon bowl elements mounted on a single handle so that corresponding points on the two elements are always the same distance apart.

9 Claims, 4 Drawing Figures

U.S. Patent   Aug 23, 1977   4,043,039
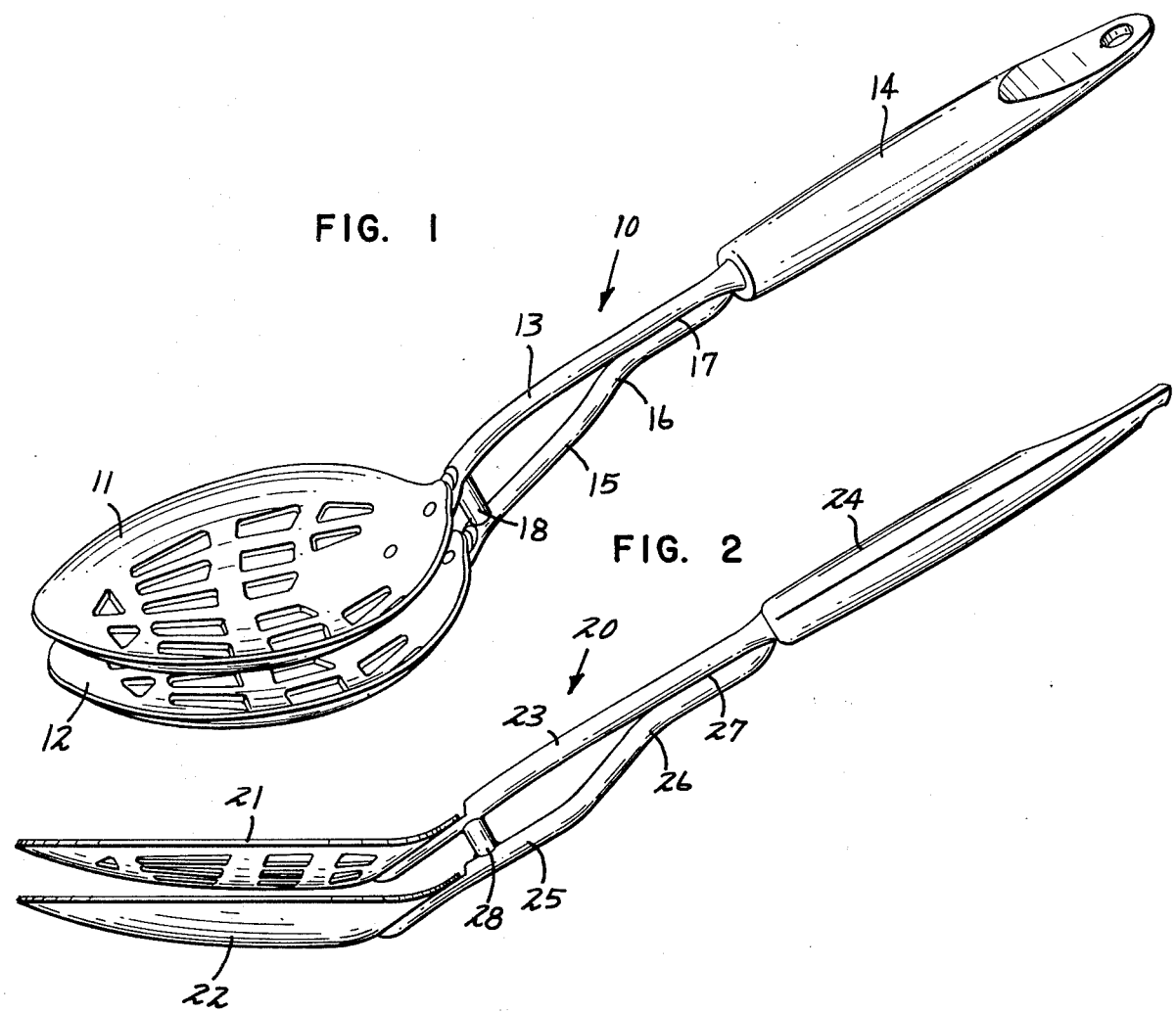
FIG. 1
FIG. 2
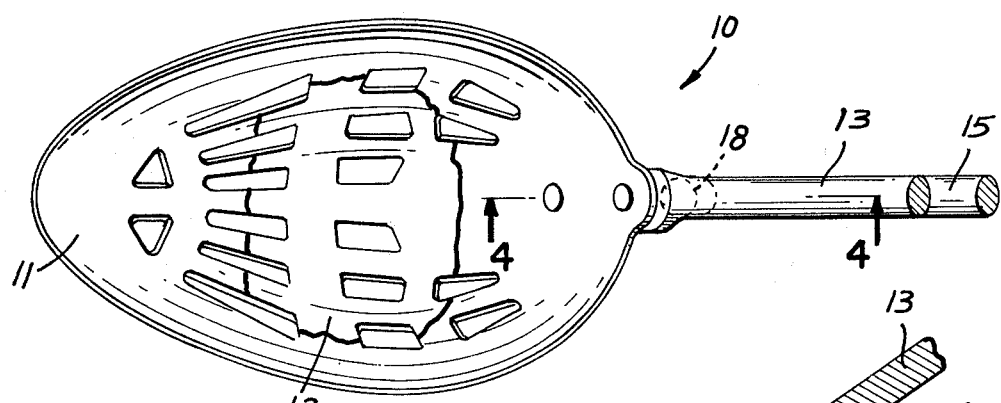
FIG. 3
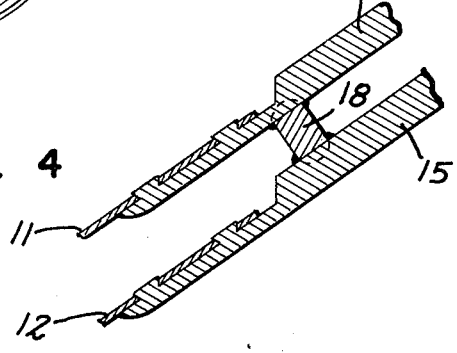
FIG. 4

STIRRING DEVICE WITH DUAL HEAD

BACKGROUND OF THE INVENTION

This invention relates to the field of cookery, and specifically comprises a kitchen utensil of new design for specialized as well as general use. One of the tasks repeatedly encountered by cooks is the preparation of sauces and gravies. It is notoriously difficult to produce a sauce or gravy which is free from lumps, well cooked, and not burned. The most vigorous and continuous stirring during a critical interval is required, and heretofore a certain amount of splattering has been accepted as unavoidable in this process.

SUMMARY OF THE INVENTION

Upon numerous occasions, I have had to prepare sauces and gravies, and I have found that for some reason the use of two spoons held together yet in slightly spaced relation results in a smoother product and also in considerably less splattering. The manipulation of two spoons is somewhat inconvenient, and I have devised a utensil which performs the function of a double spoon and yet is convenient to manipulate. This I accomplish by securing two like spoon bowl elements, one on a long shank and one on a stub shank, connecting the shanks together so that the bowl elements are everywhere spaced equally, and applying a handle to the other end of the long shank.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BREIF DESCRIPTION OF THE DRAWING

In the drawing,

FIG. 1 is an isometric view of one embodiment of my invention;

FIG. 2 is a side view of a second embodiment of the invention;

FIG. 3 is a fragmentary plan view of a portion of the invention of FIG. 1 to a somewhat larger scale a portions being broken away; and FIG. 4 is a fragmentary detailed section along the line 4—4 of FIG. 3.

DESCRIPTION OF THE PREFERRED EMBODIMENT

In FIG. 1, my implement 10 is shown to comprise a pair of spoon bowl elements 11 and 12, which are illustrated as deeply cupped, but which may have greater or less concavity, including flat configurations, at the choice of the designer. Bowl element 11 is secured to shank 13 at a preferred angle, and at the other end of shank 13 there is a handle 14. Bowl element 12 is secured to a stub shank 15 having an offset 16 and secured to shank 13 at 17 as by welding. A cross brace 18 interconnects shank 13 and stub shank 15 near their junctions with the bowl elements 11 and 12.

The bowl elements are of like configuration and size, and are perforated in the same pattern, and offset 16 and brace 18 are so dimensioned that the two bowl elements are "parallel", every pair of like points on the two elements being spaced by substantially the same distance. A spacing of three-eighths to five-eighths inches is recommended for bowl elements of ordinary size, and members 13 and 15 should be rigid enough to maintain this spacing in use.

A second embodiment 20 of the invention is shown to have bowl elements 21 and 22, shank 23, handle 24, stub shank 25 with offset 26 secured to shank 23 at 27, and cross brace 28. In this embodiment of the invention, bowl 22 is imperforate: in other respects the embodiments are the same.

In use my implement is manipulated in the same manner as an ordinary mixing spoon would be. It is doubly effective in removal of lumps, and is much less prone to splattering, when wielded vigorously, than a single spoon.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. A stirring utensil, in combination:
   first and second spoon bowl elements; said bowl elements being unconnected to each other;
   a handle;
   and means fixedly mounting said bowl elements on said handle in mutually spaced relation so that all like points on said bowl elements are everywhere substantially equidistant, and said mutually spaced bowl elements are immovable with respect to each other.

2. The structure of claim 1 in which the last named means includes a shank extending from said first bowl element to said handle, and an offset stub shank extending in a similar manner from said second bowl element and secured to the first named shank between said first bowl element and said handle.

3. The structure of claim 1 in which said bowl elements are alike and are perforated in the same pattern.

4. The structure of claim 2 together with means bridging the space between said shank and said stub shank at a location nearer the connections of said shanks to said bowl elements.

5. The structure of claim 3 in which one of said bowl elements is not perforated.

6. The structure of claim 3 in which the lower of said bowl elements is not perforated.

7. The structure of claim 1 in which the distance between said bowl elements is in the range of three-eighths inch to five-eighths inch.

8. The structure of claim 1 in which said bowl elements are nonplanar.

9. In a stirring utensil, in combination:
   a first spoon bowl element of predetermined size, concavity, and perforation pattern;
   a handle;
   a shank;
   means securing said first bowl element to one end of said shank at a preferred angle thereto, and securing said handle to the other end of said shank;
   a stub shank having an offset at a first end thereof;

a second bowl element of the same size and concavity as said first bowl element; said bowl elements being unconnected to each other;

means securing said second bowl element to the second end of said stub shank, and securing the offset end of said bowl element, so that all like points on said bowl elements are mutually spaced by equal distance;

and a cross brace fixedly joining said shank and said stub shank at locations near the connections to the said bowl elements so that the mutually spaced bowl elements are immovable with respect to each other.

* * * * *